United States Patent
Singh et al.

(10) Patent No.: US 7,260,075 B2
(45) Date of Patent: Aug. 21, 2007

(54) FAST DUPLICATE ADDRESS DETECTION ENTITY FOR MANAGING INFORMATION FOR FAST DUPLICATE ADDRESS DETECTION IN DISTRIBUTION SYSTEM AND FAST DUPLICATE ADDRESS DETECTION METHOD USING THE SAME

(75) Inventors: Shubhranshu Singh, Yongin-si (KR); Xiaoming Wang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 553 days.

(21) Appl. No.: 10/916,463

(22) Filed: Aug. 12, 2004

(65) Prior Publication Data

US 2005/0036471 A1 Feb. 17, 2005

(30) Foreign Application Priority Data

Aug. 13, 2003 (KR) ........................ 10-2003-0056151

(51) Int. Cl.
H04L 12/56 (2006.01)
H04L 12/28 (2006.01)
H04Q 7/24 (2006.01)

(52) U.S. Cl. ...................................... 370/331; 370/338

(58) Field of Classification Search ................ 370/331, 370/338, 349, 389, 401; 455/436
See application file for complete search history.

(56) References Cited

U.S. PATENT DOCUMENTS 6,947,401 B2 * 9/2005 El-Malki et al. ............ 370/331
2001/0046223 A1 * 11/2001 Malki et al. ................ 370/338
2005/0036471 A1 * 2/2005 Singh et al. ................ 370/338

* cited by examiner

Primary Examiner—William D. Cumming
(74) Attorney, Agent, or Firm—Sughrue Mion, PLLC

(57) ABSTRACT

A fast Duplicate Address Detection (DAD) Entity in a distribution system including multiple Access Points and multiple mobile nodes associated therewith. The fast DAD entity includes a memory unit for storing an address table recording information including IP addresses of the multiple mobile nodes; an interface unit for receiving Neighbor Solicitation messages that includes an IP address from a mobile node newly associated with the distribution system; a record unit for extracting the IP address of new mobile node from the Neighbor Solicitation messages, and recording the IP address in the address table; a search unit for searching the IP addresses of the multiple mobile nodes stored in the address table; a decision unit for comparing the IP address of the new mobile node with the IP addresses of the multiple mobile nodes already configured with the sub-network, and deciding whether there already present the same IP address; and a control unit for generating a response message notifying that the IP address of the new mobile node is confirmed as unique and can be used as new Care-of Address (CoA), and sending the response message to the new mobile node through the interface unit, if there does not exist the same IP address as a result of the decision of the decision unit.

6 Claims, 4 Drawing Sheets

FAST DUPLICATE ADDRESS DETECTION ENTITY FOR MANAGING INFORMATION FOR FAST DUPLICATE ADDRESS DETECTION IN DISTRIBUTION SYSTEM AND FAST DUPLICATE ADDRESS DETECTION METHOD USING THE SAME

This application claims benefit under 35 U.S.C. § 119 from Korean Patent Application No. 2003-56151, filed on Aug. 13, 2003, the entire content of which is incorporated herein by reference.

BACKGROUND OF THE INVENTION

1. Field of the Invention

The present invention relates to a fast Duplicate Address Detection (DAD) Entity for managing information for fast DAD performance in the distribution system and a method for carrying out DAD efficiently using the fast DAD Entity, and more particularly, to a structure of the fast DAD Entity for managing mobile node address information for fast DAD performance in the distribution system using the Inter-Access Point Protocol (IAPP) and a method using the fast DAD Entity for shortening the DAD time it takes to assign a Care-of Address (CoA) to a mobile node.

2. Description of the Related Art

Recently, the number of wireless internet users has increased along with the rapid development of internet supplies. There have also been more wireless communications technology developments, and improved performance of mobile terminals such as portable computers, Personal Digital Assistants (PDAs), and so on. Under the wireless internet environment, a mobile terminal frequently roams around to change its own network point of attachment. Such a mobile terminal is referred to as a mobile node.

According to the mobile IPv6, a mobile node communicates with a Correspondent Node (CN) using its own home address through its Home Agent (HA) which is a router having its own registration information, even in the event that the mobile node roams to a Foreign Network. If a mobile node is linked to a foreign network, the mobile node is assigned a temporary address, that is, a CoA, from the foreign network, and performs registration, that is, sends binding update messages to its Home Agent together with its home address.

A mobile node joins the Solicited-node Multicast Address in its linked foreign network, randomly generates a new CoA that it attempts to use, and multicasts to its newly linked network, Neighbor Solicitation messages including its own IP address, Link-Layer address, generated CoA, and so on, to have the DAD carried out.

If the mobile node fails to receive a Neighbor Advertisement message notifying of address duplication within a predetermined limited time RetransTimer, the new CoA is recognized as a unique CoA, and the mobile node performs communications using the new CoA. The predetermined limited time RetransTimer is 1000 ms by default.

However, if a node attached to the sub-network is using the new CoA, the node sends to the mobile node, Neighbor Advertisement messages including its own Link-Layer address in a reply to the Neighbor Solicitation messages. Thus, the mobile node re-generates its interface identifier (ID) at random, re-generates a new CoA, and has the DAD procedure performed again for the newly generated CoA.

As stated above, according to the existing mobile IPv6, a wait time as much as the default time of RetransTimer is required, even in the event that the DAD succeeds. There-fore, the mobile node cannot use the CoA set as a temporary address for the waiting time, which causes a considerable packet loss when in handoff mode.

There exists the Optimistic DAD (ODAD) as a scheme proposed to solve the above problem. The ODAD is based on the assumption that the DAD is far more likely to succeed than to fail. Accordingly, a mobile node immediately uses a generated new CoA (NCoA) as a temporary address and performs communications without waiting till the DAD succeeds.

However, when an address is duplicated, the ODAD causes troubles to the mobile node that uses the address as a new address as well as to another mobile node that has configured the same address previously. That is, in the event that the mobile node that uses the address as a new address attempts to send packets or receive packets from a Correspondent Node, the mobile node may be disconnected with the Correspondent Node since packets can be delivered to the mobile node that has configured the same address previously. Further, the ODAD has a problem in that the introduction to the concept of temporary address before DAD adds complexity to the IPv6 configuration.

SUMMARY OF THE INVENTION

The present invention has been developed in order to solve the above drawbacks and other problems associated with the conventional arrangement. An aspect of the present invention is to provide a fast DAD Entity that can be implemented either as part of the access router or deployed within the distribution system, to manage information for fast DAD performance, and a method using the fast DAD Entity for shortening the time it takes to perform the DAD required when a CoA is assigned to a mobile node. Distribution system concept is defined in the IEEE 802.11 standard.

In order to achieve the above aspects and/or other features of the present invention, a fast Duplicate Address Detection (DAD) Entity either as part of access router or within the distribution system including multiple Access Points and multiple mobile nodes associated therewith comprises a memory unit for storing an address table recording information including IP addresses of the multiple mobile nodes; an interface unit for receiving Neighbor Solicitation messages that includes an IP address from a new mobile node newly associating to the distribution system; a record unit for extracting the IP address of the new mobile node from the Neighbor Solicitation messages, and recording the IP address in the address table; a search unit for searching the IP addresses of the multiple mobile nodes stored in the address table; a decision unit for comparing the IP address of the new mobile node with the IP addresses of the multiple mobile nodes that are already configured to the sub-network, and deciding whether there already exists the same IP address in that sub-network; and a control unit for generating a response message notifying that the IP address of the first mobile node is confirmed as unique and can be used as new Care-of Address (CoA), and sending the response message to the new mobile node through the interface unit, if there does not exist the same IP address as a result of the decision of the decision unit.

Preferably, the information recorded in the address table includes the IP addresses and MAC addresses of the multiple mobile nodes and Basic Service Set Identifiers (BSSIDs) of the Access Points to which the multiple mobile nodes are associated. The information about MAC addresses of the mobile nodes and the BSSIDs of the Access Points to which the multiple mobile nodes are associated can be acquired from IAPP messages, and the IP addresses of the multiple mobile nodes can be obtained by a Neighbor Discovery Detection mechanism of a corresponding link.

Further, the record unit does not record the new IP address if the address table has same IP address as the new mobile node previously recorded.

Further, in order to achieve the above aspect, a Duplicate Address Detection (DAD) method that uses fast DAD Entity for managing a distribution system including multiple Access Points and multiple mobile nodes associated therewith comprises steps of receiving Neighbor Solicitation messages that includes an IP address of a mobile node newly associated with the distribution system; extracting the IP address of the new mobile node from the Neighbor Solicitation messages, and recording the IP address in an address table, wherein the fast DAD Entity maintains the address table recording information including IP addresses of the multiple mobile nodes; searching the IP addresses of the multiple mobile nodes recorded in the address table; comparing the IP address of the new mobile node with the IP addresses of the multiple mobile nodes already configured to the sub-network, and deciding whether there already exists the same IP address; and, if the same IP address does not exist, in order to perform communications in the distribution system using the IP address of the new mobile node as the new CoA, preparing a response message indicating that the new CoA is confirmed as unique and can be used as CoA, and sending the response message to the new mobile node.

The IAPP is a protocol for Wireless LANs, which provides a code necessary for efficient interoperations among multiple Access Points (APs) in the distribution system consisting of the Access Points connected by Ethernet or IEEE 802 Layer-2 networks in general.

The IAPP Layer-2 indicates the origination and destination of delivered packets using IEEE 802 MAC addresses. Accordingly, each Access Point bridges a mobile node to the distribution system using the MAC address of the mobile node connecting to the distribution system. Further, each Access Point bridges a mobile node using the Basic Service Set Identifier (BSSID) which is the MAC address of its own.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Figure 1A:
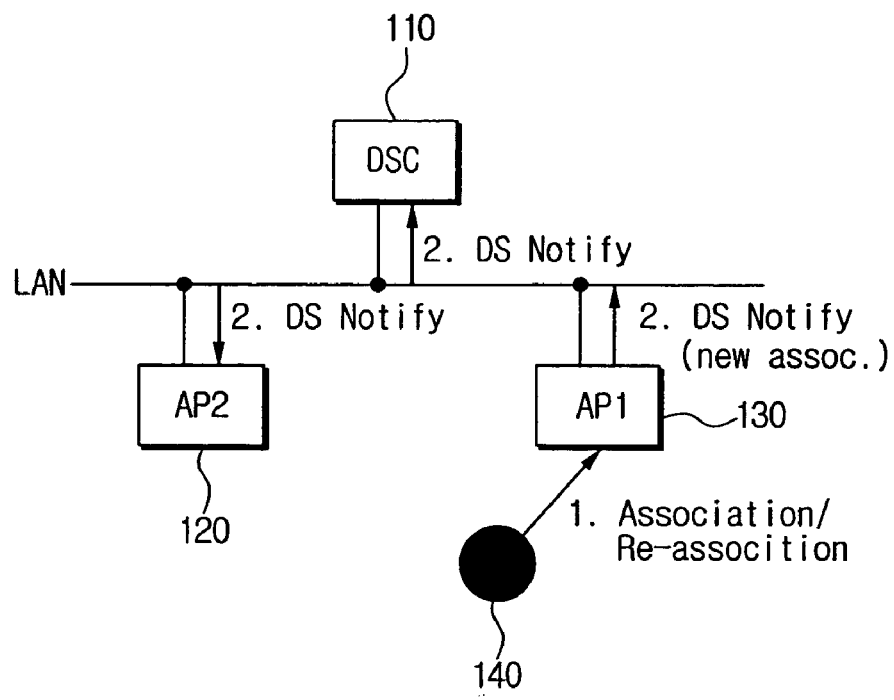
FIG. 1A is a view for explaining associations and re-associations of a mobile node in the distribution system.

Certain embodiments of the present invention will be described in greater detail with reference to the accompanying drawings. In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1B:
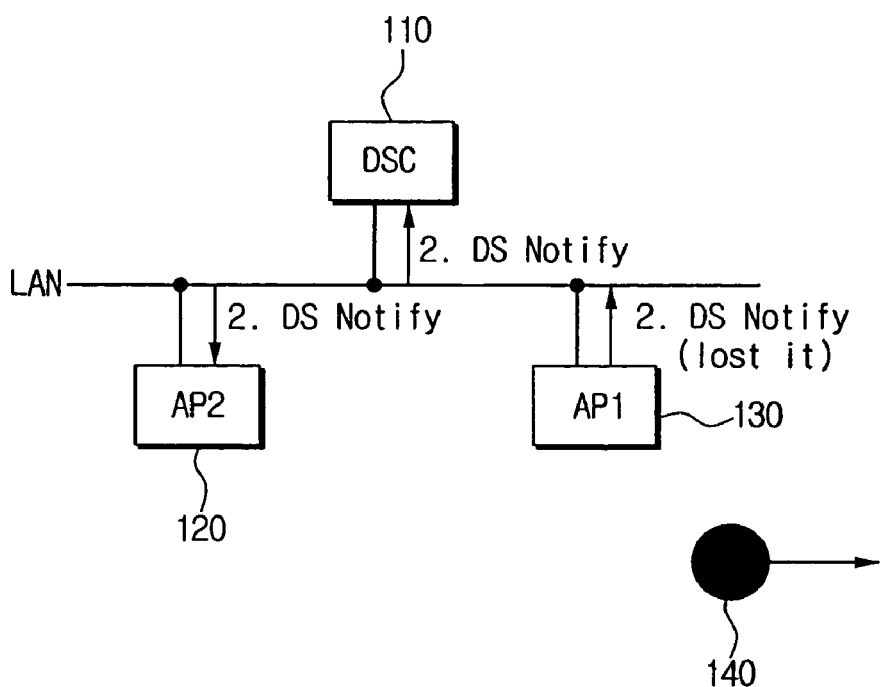
FIG. 1B is a view for explaining the roaming-out of a mobile node in the distribution system.

FIG. 1A is a view for explaining associations and re-associations of a mobile node in the distribution system, and FIG. 1B is a view for explaining the roaming-out of a mobile node in the distribution system.

Referring to FIGS. 1A and 1B, when a mobile node 140 attempts to associate or re-associate to an Access Point 130, the Access Point 130 broadcasts a DS (distribution system) Notify message to all the other Access Points 110 and 120 in the distribution system. Accordingly, each Access Point gets to know the information of the mobile node. In the event that the mobile node 140 roams out of the distribution system or powers off to disassociate with the Access Point 130, the Access Point 130 to which the mobile node 140 is associated detects the roaming-out of the mobile node 140, and broadcasts the DS Notify to the other Access Points.

Figure 2:
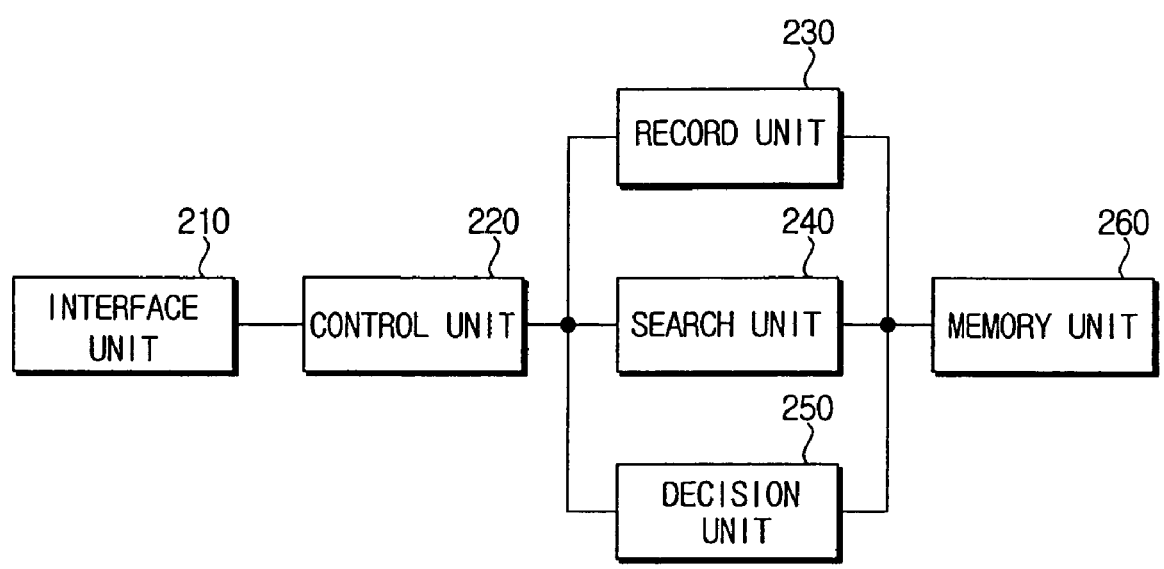
FIG. 2 is a block diagram for showing a structure of a fast DAD Entity in the distribution system according to an embodiment of the present invention.

FIG. 2 is a block diagram for showing a structure of a fast DAD Entity in the distribution system according to an embodiment of the present invention.

The fast DAD Entity includes an interface unit 210, a control unit 220, a record unit 230, a search unit 240, a decision unit 250, and a memory unit 260.

The memory unit 260 stores an address table recording information about mobile nodes connected to the distribution system. The address table tabulates and maintains respective mobile nodes' MAC addresses, BSSIDs of Access Points to which the mobile nodes are associated, and mobile nodes' IP addresses.

That is, the fast DAD Entity records the mobile nodes' IP addresses in the address table stored in the memory unit 260, in addition to the MAC addresses of all the mobile nodes connected to the distribution system and the BSSIDs of Access Points to which the mobile nodes are associated. The IP address, of a mobile node can be acquired from a Neighbor, Solicitation message sent when the mobile node is in DAD to confirm a new CoA upon attempting to associate with an Access Point.

The fast DAD Entity receives Neighbor Solicitation messages multicast from a mobile node newly associated to an Access Point in the distribution system; through the interface unit 210. The Neighbor Solicitation message is a message multicast to all mobile nodes and Access Points that are connected to the distribution system upon performing DAD to confirm a new CoA to be used for communications in the distribution system in the event that a mobile node attempts to newly connect or re-connect to the distribution system, as stated above.

The record unit 230 extracts an IP address of the mobile node from the Neighbor Solicitation message, and tabulates and records in the address table the MAC address of the mobile node together with the BSSID of an Access Point to which the mobile node is associated. However if the IP address of the mobile node is already stored in the address table of the memory unit 260 together with the MAC address of the mobile node and the BSSID of the Access Point to which the mobile node was associated, there is no need to record the IP address again.

The search unit 240 searches for IP addresses of mobile nodes stored in the address table. This is for comparing the IP address of the mobile node newly connected to the distribution system, with the IP addresses of the other mobile nodes searched. The decision unit 250 compares the IP addresses of the mobile nodes searched by the search unit 240 with the, IP address of the newly connected mobile node, and decides whether the same IP address exists.

Figure 3:
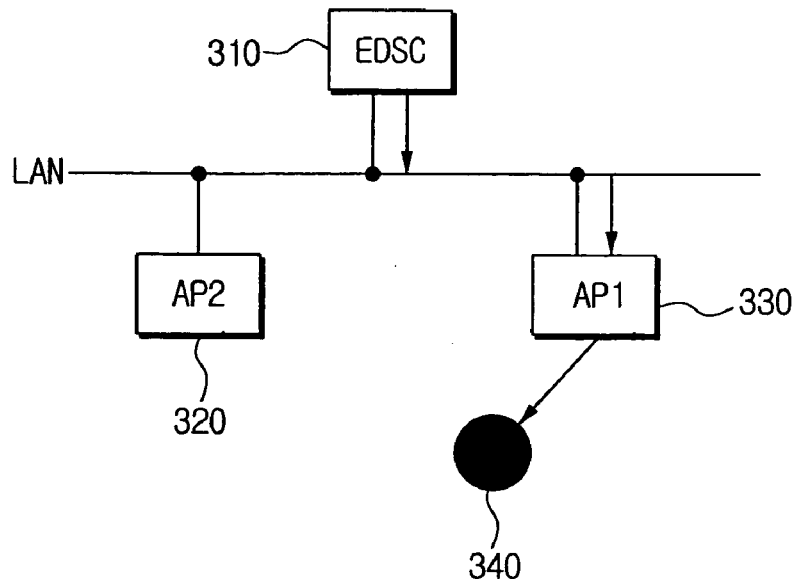
FIG. 3 is a view for explaining successful DAD using the fast DAD Entity in the distribution system according to an embodiment of the present invention.

FIG. 3 is a view for explaining successful DAD using the fast DAD Entity implemented either as part of access router or within the distribution system according to an embodiment of the present invention. FIG. 3 illustrates a structure of an address table the fast DAD Entity stores in the memory unit 260.

The control unit 220 confirms an IP address of the newly associated mobile node 340 as a new CoA if the decision unit 250 decides that there does not exist the same IP address, prepares a response message indicating that the new CoA is unique and can be used as new CoA, and sends the response message to the newly associated mobile node 340 through an Access Point 330. Accordingly, the newly associated mobile node 340 uses the IP address as the new CoA to perform communications in the distribution system.

Figure 4:
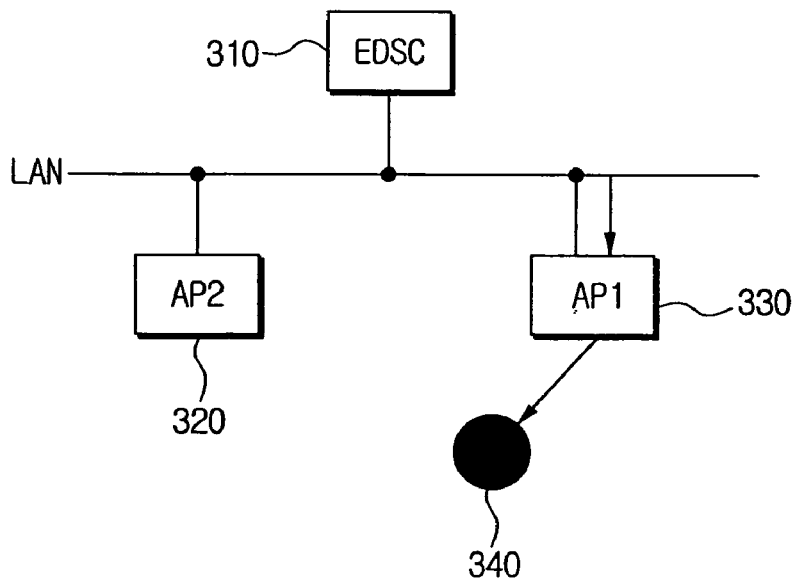
FIG. 4 is a view for explaining a failed DAD using the fast DAD Entity in the distribution system according to an embodiment of the present invention.

FIG. 4 is a view for explaining a failed DAD using the fast DAD Entity in the distribution system according to an embodiment of the present invention. If the decision unit 250 decides that there exists a different mobile node having the same IP address, the control unit 220 does not prepare the response message as discussed above. In this instance, the different mobile node having the same IP address receives a Neighbor Solicitation message that the newly associated mobile node 340 broadcasts, prepares a Neighbor Advertisement (NA) message indicating that a different mobile node uses the same IP address, and sends the NA message to the mobile node 340 that has broadcast the Neighbor Solicitation message, according to the standard specifications.

Accordingly, the newly associated mobile node 340 receives the NA message through the Access Point 330 to which it is associated, and gets to know that the DAD failed. Thus, the newly associated mobile node 340 re-prepares a new CoA at random, and retries the DAD procedure. It is preferable that such a DAD is tried up to five times at maximum.

Figure 5:
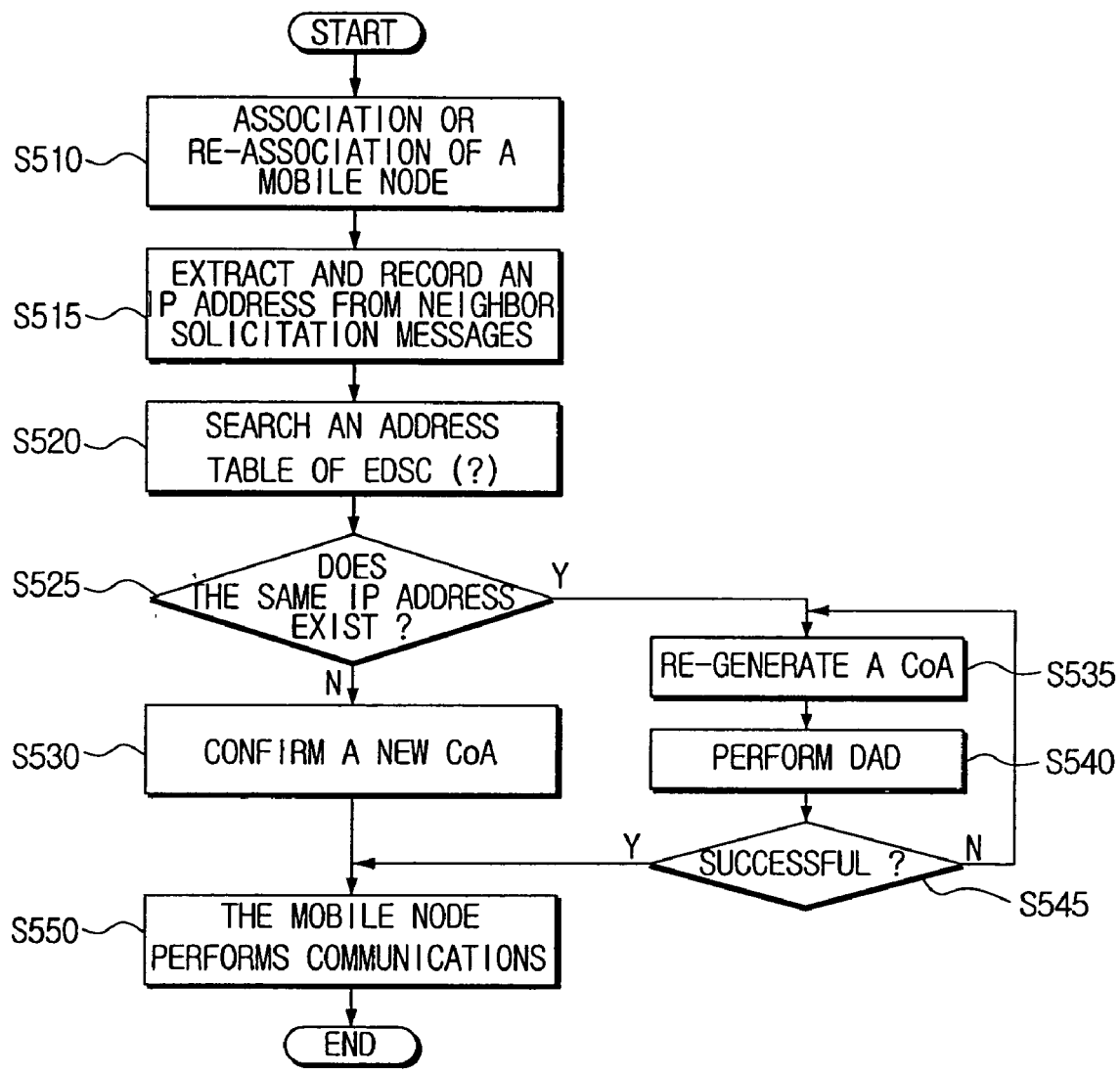
FIG. 5 is a flow chart for showing a DAD method using the fast DAD Entity in the distribution system according to an embodiment of the present invention.

FIG. 5 is a flow chart for showing a DAD method using the fast DAD Entity in the distribution system according to an embodiment of the present invention.

If a mobile node is newly associated or re-associated to the distribution system (S510), the newly associated mobile node performs DAD to confirm a new CoA. Accordingly, the mobile node prepares a Neighbor Solicitation (NS) message including its own IP address and MAC address, and broadcasts the NS message to all mobile nodes and Access Points that are connected to the distribution system.

The fast DAD Entity extracts an IP address of the newly associated mobile node from such a NS message, and records the IP address in the address table that the fast DAD Entity maintains, together with the MAC address of the mobile node and the BSSID of an Access Point to which the mobile node is associated (S515). The address table tabulates and maintains the IP addresses and MAC addresses of all mobile nodes connected to the distribution system, together with BSSIDs of Access Points to which the mobile nodes are associated.

Next, the fast DAD Entity searches the mobile nodes' IP addresses recorded in the address table it maintains (S520), compares the searched mobile nodes' IP addresses with the IP address of the newly associated mobile node, and decides whether there exists the same IP address (S525).

If it is decided that the same IP address does not exist, the IP address of the newly associated mobile node is confirmed as a new CoA for the mobile node to use (S530), the fast DAD Entity prepares a response message notifying that the new CoA is confirmed, and sends the response message to the newly associated mobile node. Therefore, the newly associated mobile node uses this IP address as the new CoA to perform communications in the distribution system (S550).

However, if it is decided that there exists a different mobile node having the same IP address, the different mobile node having the same IP address receives a NS message that the newly associated mobile node broadcasts, prepares a NA message notifying that it uses the same IP address as the new CoA, and sends the NA message to the newly associated mobile node, according to the standard specifications.

Therefore, the newly associated mobile node receives the NA message, and gets to know the fact that the DAD failed. The newly associated mobile node re-prepares the new CoA at random (S535), and re-tries the DAD (S540). Based on whether such a DAD succeeded or failed (S545), the newly associated mobile node generates a CoA again if failed, and repeats the DAD procedure.

Accordingly, it is enabled to reduce the default time of RetransTimer for waiting to receive Neighbor Advertisement messages for confirmation on whether or not DAD succeeds, so that a mobile node immediately performs communications using an unique IP address as its CoA in the event that there does not exist any other mobile nodes using the same IP address as the mobile node's. The fast DAD Entity should operate from the initialization of a network, and, if the system is interrupted due to power failure during its operation, the fast DAD Entity can not re-operate even though power is re-supplied, since it can not learn address information of all the nodes configured on the distribution system.

According to an embodiment of the present invention, the fast DAD Entity managing the distribution system stores information including the IP addresses of the mobile nodes connected to the distribution system in the address table it has, searches the address table to rapidly detect whether there exists the same IP address, and, if the same IP address does not exist, the fast DAD Entity enables a mobile node to use the IP address as a CoA for communications, so that it can perform DAD fast since it does not take the default time of RetransTimer required for conventional DAD procedure.

Therefore, in the event that a mobile node is connected or re-connected to the distribution system, the time required to configure a new CoA, that is, the DAD time is reduced, and as a result, fast handoffs and prevent delays for communications is achieved.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A fast Duplicate Address Detection (DAD) Entity that can be implemented either as part of the access router or within the distribution system that includes multiple Access Points and multiple mobile nodes associated therewith, comprising:
    a memory unit for storing an address table recording information including IP addresses of the multiple mobile nodes;
    an interface unit for receiving Neighbor Solicitation messages that includes the IP address of the mobile node newly associated with the distribution system;
    a record unit for extracting the IP address of the mobile node from the Neighbor Solicitation messages, and records the IP address in the address table;
    a search unit for searching the IP addresses of the multiple mobile nodes stored in the address table;
    a decision unit for comparing the IP address of the new mobile node with the IP addresses of the multiple mobile nodes already configured on the sub-network, and decides whether there exists a same IP address; and
    a control unit for generating a response message notifying that the IP address of the new mobile node is unique on this sub-network and can be used as new Care-of Address (CoA), and sending this response message to the new mobile node through the interface unit, if there does not exist the same IP address as a result of the decision of the decision unit.

2. The fast DAD Entity as claimed in claim 1, wherein the information recorded in the address table includes the IP addresses, MAC addresses of the multiple mobile nodes and Basic Service Set Identifiers (BSSIDs) of the Access Points to which the multiple mobile nodes are associated.

3. The fast DAD Entity as claimed in claim 1, wherein the record unit does not record the IP address if the address table has the IP address of the new mobile node, previously recorded.

4. An optimized Duplicate Address Detection (DAD) method using the fast DAD Entity for managing a distribution system including multiple Access Points and multiple mobile nodes associated therewith, comprising:
    receiving Neighbor Solicitation messages that includes IP address of the mobile node newly associated with the distribution system;
    extracting the IP address of the new mobile node from the Neighbor Solicitation messages, and recording the IP address in an address table, wherein the fast DAD Entity maintains the address table recording information including IP addresses of the multiple mobile nodes;
    searching the IP addresses of the multiple mobile nodes recorded in the address table;
    comparing the IP address of the new mobile node with the IP addresses of the multiple mobile nodes already configured on the sub-network and deciding whether there exists a same IP address; and
    generating a response message notifying that the IP address of the new mobile node is confirmed as unique and can be used as new Care-of Address (CoA), and sending the response message to the first mobile node, if the same IP address does not exist as a result of the decision.

5. The DAD method as claimed in claim 4, wherein the information recorded in the address table includes the IP addresses, MAC addresses of the multiple mobile nodes and Basic Service Set Identifiers (BSSIDs) of the Access Points to which the multiple mobile nodes are associated.

6. The DAD method as claimed in claim 4, wherein the recording step does not record the IP address if the address table has the IP address of the new mobile node, previously recorded.

* * * * *